US011871312B2

(12) United States Patent
Chen et al.

(10) Patent No.: US 11,871,312 B2
(45) Date of Patent: Jan. 9, 2024

(54) METHOD AND APPARATUS OF SIDELINK RESOURCE ALLOCATION FOR V2X IN NEW RADIO MOBILE COMMUNICATIONS

(71) Applicant: MediaTek Inc., Hsinchu (TW)

(72) Inventors: Ju-Ya Chen, Hsinchu (TW); Ahmet Umut Ugurlu, Cambridge (GB)

(73) Assignee: MediaTek Inc.

( * ) Notice: Subject to any disclaimer, the term of this patent is extended or adjusted under 35 U.S.C. 154(b) by 167 days.

(21) Appl. No.: 16/586,276

(22) Filed: Sep. 27, 2019

(65) Prior Publication Data

US 2020/0107170 A1 Apr. 2, 2020

Related U.S. Application Data

(60) Provisional application No. 62/738,191, filed on Sep. 28, 2018.

(51) Int. Cl.
*H04W 4/40* (2018.01)
*H04W 76/27* (2018.01)
(Continued)

(52) U.S. Cl.
CPC ............ *H04W 4/40* (2018.02); *H04L 1/1812* (2013.01); *H04L 5/0055* (2013.01); *H04W 72/23* (2023.01); *H04W 76/27* (2018.02)

(58) Field of Classification Search
CPC ... H04L 1/1812; H04L 5/0055; H04L 1/1671; H04L 1/1896; H04L 5/0044;
(Continued)

(56) References Cited

U.S. PATENT DOCUMENTS

2018/0049143 A1  2/2018  Gupta et al.
2018/0139724 A1  5/2018  Loehr et al.
(Continued)

FOREIGN PATENT DOCUMENTS

CN  105451211 A  3/2016

OTHER PUBLICATIONS

China National Intellectual Property Administration, International Search Report and Written Opinion for PCT/CN2019/108673, dated Dec. 27, 2019.
(Continued)

*Primary Examiner* — Derrick V Rose
(74) *Attorney, Agent, or Firm* — Han IP PLLC; Andy M. Han

(57) ABSTRACT

Various examples and schemes pertaining to sidelink resource allocation for vehicle-to-everything (V2X) in New Radio (NR) mobile communications are described. An apparatus implemented in a first user equipment (UE) receives a first signaling from a network node of a wireless network, with the first signaling configuring a first sidelink resource for a sidelink between the first UE and a second UE. The apparatus transmits a packet or transport block (TB) to the second UE on the sidelink using the configured first sidelink resource. The apparatus also receives a second signaling from the network node responsive to the second UE failing to decode the packet or TB, with the second signaling dynamically configuring a second sidelink resource for the sidelink. The apparatus then retransmits the packet or TB to the second UE on the sidelink using the dynamically configured second sidelink resource.

19 Claims, 5 Drawing Sheets

(51) Int. Cl.
  *H04W 72/12* (2023.01)
  *H04W 72/14* (2009.01)
  *H04L 1/18* (2023.01)
  *H04L 5/00* (2006.01)
  *H04L 1/1812* (2023.01)
  *H04W 72/23* (2023.01)

(58) Field of Classification Search
  CPC .. H04L 5/0053; H04W 4/40; H04W 72/1289; H04W 72/14; H04W 76/27; H04W 4/70; H04W 72/042; H04W 76/14; H04W 76/18
  See application file for complete search history.

(56) References Cited

U.S. PATENT DOCUMENTS

2018/0310333 A1* 10/2018 Akkarakaran .... H04W 72/1278
2019/0052436 A1* 2/2019 Desai ................... H04L 5/0055
2019/0246385 A1* 8/2019 Lin ..................... H04W 72/044
2019/0306835 A1* 10/2019 Hoang ................ H04W 72/082
2020/0029318 A1* 1/2020 Guo ..................... H04L 1/1819

OTHER PUBLICATIONS

Huawei et al., Discussion on NR sidelink resource allocation by NR Uu and LTE Uu, 3GPP TSG RAN WG1, Meeting #94, R1-1808095, Gothenburg, Sweden, Aug. 20-24, 2018.
Mediatek Inc., Uu-based enhancement to control NR sidelink, 3GPP TSG RAN1 WG1 Meeting #94bis, R1-1810456, Chengdu, China, Oct. 8-12, 2018.
China National Intellectual Property Administration, First Office Action in China Patent Application No. 201980030432.8, dated Apr. 22, 2023.
Huawei et al.: "Discussion on NR sidelink resource allocation by NR Uu and LTE Uu", 3GPP TSG RAN WG1 Meeting #94, R1-1808095, pp. 1-24, Aug. 24, 2018.

* cited by examiner

METHOD AND APPARATUS OF SIDELINK RESOURCE ALLOCATION FOR V2X IN NEW RADIO MOBILE COMMUNICATIONS

CROSS REFERENCE TO RELATED PATENT APPLICATION(S)

The present disclosure is part of a non-provisional application claiming the priority benefit of U.S. Patent Application No. 62/738,191, filed on 28 Sep. 2018, the content of which being incorporated by reference in its entirety.

TECHNICAL FIELD

The present disclosure is generally related to wireless communications and, more particularly, to techniques pertaining to sidelink resource allocation for vehicle-to-everything (V2X) in New Radio (NR) mobile communications.

BACKGROUND

Unless otherwise indicated herein, approaches described in this section are not prior art to the claims listed below and are not admitted as prior art by inclusion in this section.

Under the $3^{rd}$ Generation Partnership Project (3GPP) specifications, Long-Term Evolution (LTE) V2X configures resource pools for sidelink transmissions, and the transmissions are realized by a semi-persistent scheduling (SPS)-like resource allocation type. While LTE V2X supports broadcast transmission and periodic traffic patterns only, it is desirable that NR V2X supports unicast, groupcast and broadcast transmissions as well as both periodic and aperiodic traffic patterns. In addition, it is also desirable that NR V2X supports low-latency and/or high-reliability services for some use cases.

Based on different requirements of NR, it is desirable for resource allocation types supported in NR to be more than those supported in LTE V2X. For instance, with respect to enhanced mobile broadband (eMBB), NR has three types of resource allocation techniques, namely: dynamic grants, Type-1 grant-free (GF), and Type-2 SPS. In general, Type-1 GF and Type-2 SPS can achieve lower latency than dynamic grants. On the other hand, dynamic grants offer good reliability and tend to be suitable for network-controlled scheduling when a user equipment (UE) is in coverage. Due to high signaling overhead, dynamic grants are also suitable for aperiodic traffic whereas Type-1 GF and Type-2 SPS tend to perform well with periodic traffic patterns. Reconfiguration of some link parameter (e.g., modulation coding scheme (MCS)) is signaled via radio resource control (RRC) in Type-1 GF, while link adaptation parameters can be signaled via downlink control information (DCI) in dynamic grants and Type-2 SPS. Thus, Type-1 GF may not be a good candidate for dynamic link adaptation.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure aims to propose concepts, solutions, schemes, techniques, designs, methods and apparatus pertaining to sidelink resource allocation for V2X in NR mobile communications.

In one aspect, a method may involve a processor of an apparatus, implemented in a first UE, receiving a first signaling from a network node of a wireless network, with the first signaling configuring a first sidelink resource for a sidelink between the first UE and a second UE. The method may also involve the processor transmitting a packet or transport block (TB) to the second UE on the sidelink using the configured first sidelink resource. The method may further involve the processor receiving a second signaling from the network node responsive to the second UE failing to decode the packet or TB, with the second signaling dynamically configuring a second sidelink resource for the sidelink. The method may additionally involve the processor retransmitting the packet or TB to the second UE on the sidelink using the dynamically configured second sidelink resource.

In one aspect, a method may involve a processor of an apparatus, implemented in a first UE, receiving a first signaling from a network node of a wireless network, with the first signaling configuring a first sidelink resource for a sidelink between the first UE and a second UE. The method may also involve the processor transmitting a packet or TB to the second UE on the sidelink using the configured first sidelink resource. The method may further involve the processor receiving a hybrid automatic repeat request negative acknowledgement (HARQ-NACK) from the second UE responsive to the second UE failing to decode the packet or TB. The method may additionally involve the processor switching between a first mode of operation and a second mode of operation before a retransmission of the packet of TB to the second UE due to the NACK-ACK. In the first mode of operation, resource allocation for the sidelink may be controlled by the network node, and, in the second mode of operation, the resource allocation for the sidelink may be preconfigured by the network node and autonomously controlled by the first UE.

In one aspect, an apparatus implemented as a first UE may include a transceiver and a processor coupled to the transceiver. The transceiver may be configured to wirelessly communicate with a second UE and a network node of a wireless network. The processor may be configured to perform some operations, including: (a) receiving, via the transceiver, a first signaling from a network node of a wireless network, the first signaling configuring a first sidelink resource for a sidelink between the first UE and a second UE; (b) transmitting, via the transceiver, a packet or TB to the second UE on the sidelink using the configured first sidelink resource; (c) receiving, via the transceiver, a second signaling from the network node responsive to the second UE failing to decode the packet or TB, the second signaling dynamically configuring a second sidelink resource for the sidelink; and (d) retransmitting, via the transceiver, the packet or TB to the second UE on the sidelink using the dynamically configured second sidelink resource.

It is noteworthy that, although description provided herein may be in the context of certain radio access technologies, networks and network topologies such as NR V2X, the proposed concepts, schemes and any variation(s)/derivative(s) thereof may be implemented in, for and by other types of radio access technologies, networks and network topologies such as, for example and without limitation, $5^{th}$ Generation (5G), Long-Term Evolution (LTE), LTE-Advanced, LTE-Advanced Pro and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to sidelink resource allocation for V2X in NR mobile communications. According to the present disclosure, a number of possible solutions may be implemented separately or jointly. That is, although these possible solutions may be described below separately, two or more of these possible solutions may be implemented in one combination or another.

Figure 1:
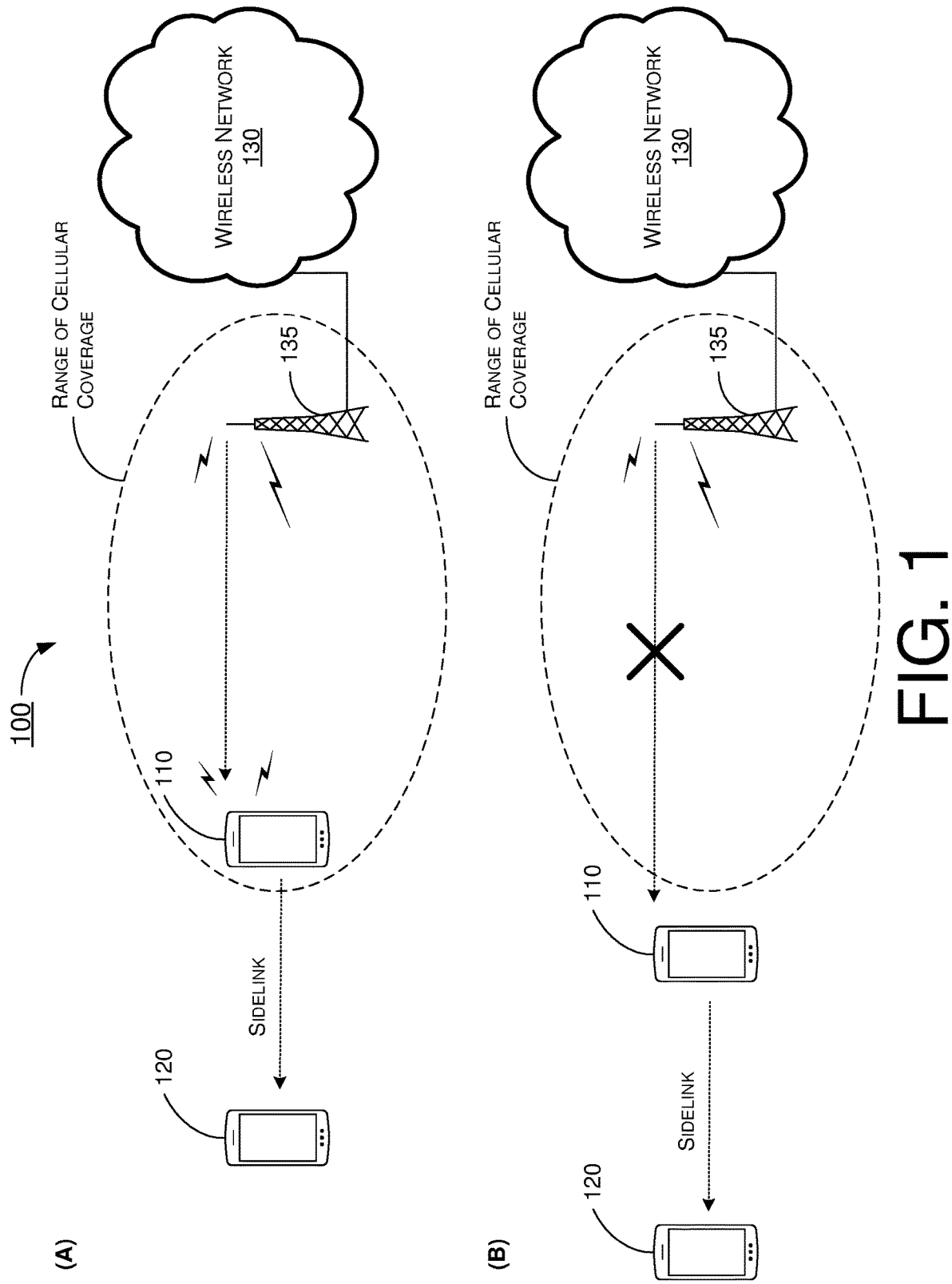
FIG. 1 is a diagram of an example network environment in which various solutions and schemes in accordance with the present disclosure may be implemented.
Figure 2:
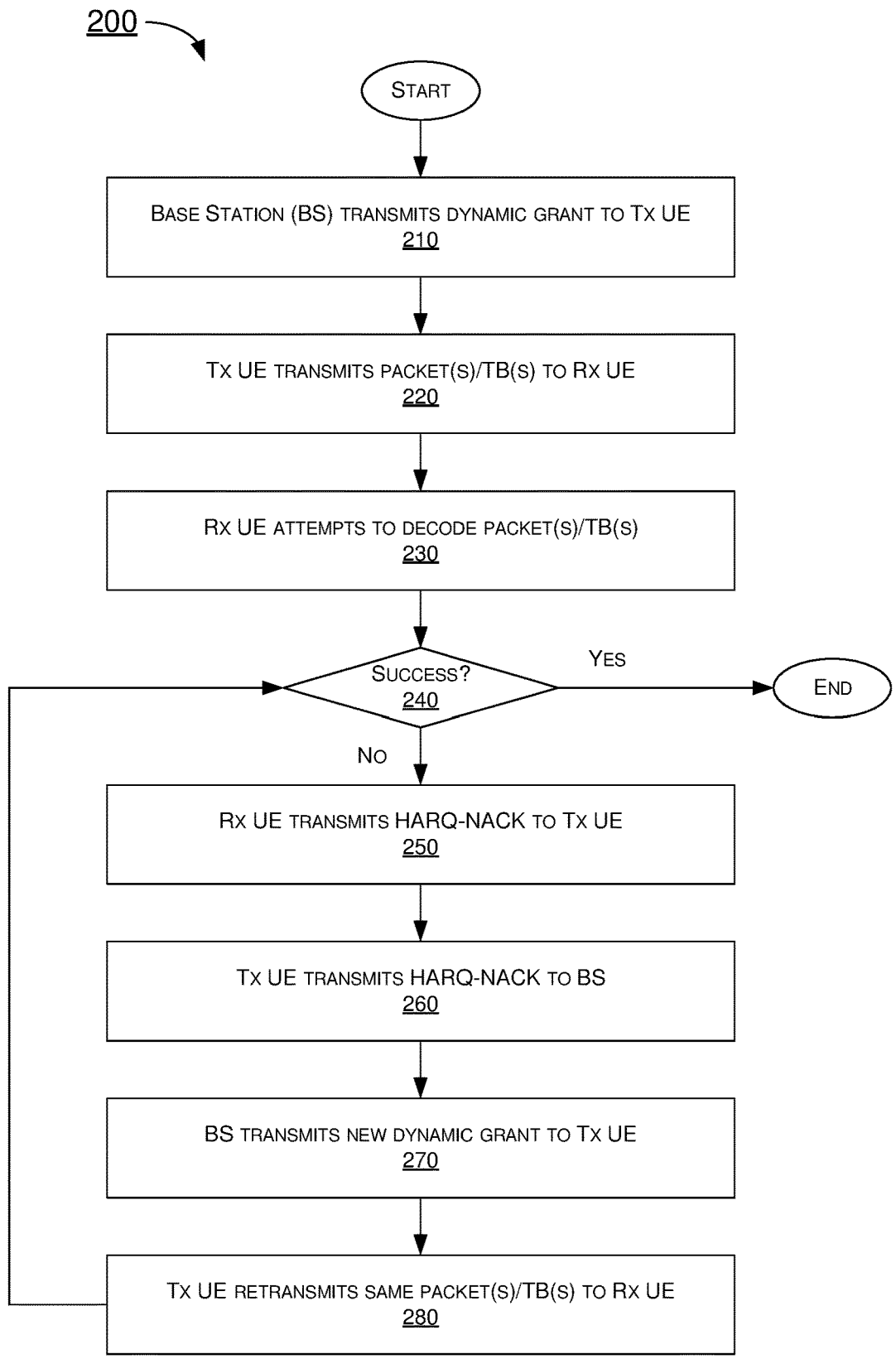
FIG. 2 is a flowchart of an example operational procedure in accordance with an implementation of the present disclosure.

FIG. 1 illustrates an example network environment 100 in which various solutions and schemes in accordance with the present disclosure may be implemented. FIG. 2 illustrates an example operational procedure 200 with respect to NR sidelink resource allocation for V2X in accordance with an implementation of the present disclosure. Operational procedure 200 may be implemented in network environment 100. The following description of various proposed schemes in accordance with the present disclosure is provided with reference to FIG. 1 and FIG. 2.

Referring to FIG. 1, network environment 100 may be an NR V2X communication environment involving a first UE 110, a second UE 120 and a wireless network 130. Wireless network 130 may be in wireless communication with first UE 110 via a base station 135 (e.g., an eNB, gNB or transmit/receive point (TRP)), and first UE 110 may be in wireless communication with second UE 120 via NR sidelink. Each of first UE 110 and second UE 120 may be in or as a part of, for example and without limitation, a portable apparatus (e.g., smartphone), a vehicle or a component thereof, a roadside unit (RSU) (e.g., a traffic signal, a street lamp, a roadside sensor or a roadside structure) or an Internet of Thing (IoT) device (e.g., a sensor). In network environment 100, first UE 110, second UE 120 and wireless network 130 (via base station 135) may implement various schemes pertaining to sidelink resource allocation for V2X in NR mobile communications in accordance with the present disclosure, as described below.

Specifically, Part (A) of FIG. 1 illustrates first UE 110 and second UE 120 operating in Mode-1 of NR sidelink resource allocation (of network-controlled resource allocation) as first UE 110 is in coverage of base station 135 and there is data to be transmitted from first UE 110 to second UE 120 via NR sidelink. Thus, allocation of resources on the sidelink between first UE 110 and second UE 120 may be controlled by base station 135. Moreover, Part (B) of FIG. 1 illustrates first UE 110 and second UE 120 operating in Mode-2 of NR sidelink resource allocation (or UE-autonomous resource allocation) as first UE 110 is out of coverage of base station 135 and there is data to be transmitted from first UE 110 to second UE 120 via NR sidelink. Thus, allocation of resources on the sidelink between first UE 110 and second UE 120 may be preconfigured by base station 130 and then autonomously controlled by first UE 110. It is noteworthy that, while first UE 110 is out of coverage of base station 135 on one frequency, first UE 110 may at the same time be in coverage with another base station of another network on a different frequency, and vice versa. That is, so long as first UE 110 is in coverage of a given base station, whether base station 135 or another base station (not shown), that base station may control the resource allocation for the sidelink between first UE 110 and second UE 120 under Mode-1 of NR sidelink resource allocation.

Referring to FIG. 2, procedure 200 may include one or more operations, actions, or functions as represented by one or more of blocks 210, 220, 230, 240, 250, 260, 270 and 280. Although illustrated as discrete blocks, various blocks of procedure 200 may be divided into additional blocks, combined into fewer blocks, or eliminated, depending on the desired implementation. Procedure 200 may be implemented by in network environment 100 in accordance with the present disclosure. Procedure 200 may begin at 210.

At 210, procedure 200 may involve base station 135 transmitting a dynamic grant to first UE 110 which functions as a source UE or a transmitting (Tx) UE. Procedure 200 may proceed from 210 to 220.

At 220, procedure 200 may involve first UE 110 transmitting one or more packets or transport blocks (TBs) to second UE 120 which functions as a destination UE or a receiving (Rx) UE. Procedure 200 may proceed from 220 to 230.

At 230, procedure 200 may involve second UE 120 attempting to decode the one or more packets/TBs. Procedure 200 may proceed from 230 to 240.

At 240, procedure 200 may involve second UE 120 determining whether the attempted decoding is a success of failure. In case of failed decoding, procedure 200 may proceed from 240 to 250. Otherwise, in case of successful decoding, procedure 200 may end.

At 250, procedure 200 may involve second UE 120 transmitting a hybrid automatic repeat request (HARQ) negative acknowledgement (NACK) to first UE 110. Procedure 200 may proceed from 250 to 260.

At 260, procedure 200 may involve first UE 110 transmitting or forwarding the HARQ-NACK to base station 135. Procedure 200 may proceed from 260 to 270.

At 270, procedure 200 may involve base station 135 transmitting a new dynamic grant to first UE 110. Procedure 200 may proceed from 270 to 280.

At 280, procedure 200 may involve first UE 110 retransmitting the same packet(s)/TB(s) to second UE 120. Procedure 200 may proceed from 280 to 240 and may either end or proceed from 240 to 250 as described above.

The following description of various proposed schemes in accordance with the present disclosure may be utilized by first UE 110, second UE 120 and base station 130 in executing procedure 200. In other words, although not explicitly mentioned, procedure 200 may be applied and executed by first UE 110, second UE 120 and base station 130 in each of the proposed scheme described below.

Under the 3GPP specification, NR sidelink supports both aperiodic and periodic traffic with both small and large packet sizes, and NR sidelink offers unicast, groupcast and broadcast types of transmission. When the sidelink resources are configured by base station 135 in Mode-1, scheduling decisions may be made based on requirements and channel conditions. Since all three resource allocation techniques of dynamic grants, Type-1 GF and Type-2 SPS in NR are controlled or preconfigured by base station 135, they can be considered for sidelink Mode-1 operation.

As for resource allocation in Mode-2, first UE 110 may determine or otherwise select transmission resources from a pool of preconfigured sidelink resources. On one hand, an RRC-configured technique similar to Type-1 GF may be suitable for broadcast and groupcast transmissions when no link adaptation may be needed. Base station 135 may preconfigure first UE 110 by RRC when first UE 110 is in coverage. Activation may either be triggered via RRC from base station 135 when first UE 110 is still in coverage or, alternatively, triggered autonomously when first UE 110 falls out of coverage. On the other hand, a sidelink control information (SCI)-based technique similar to Type-2 SPS may be suitable for unicast and groupcast transmissions when link adaptation may be necessary. Similar to NR Type-2 SPS, configuration and activation may be triggered via DCI from base station 135, and reconfiguration may also be triggered via SCI on sidelink when first UE 110 operates in Mode-2. Moreover, similar to NR Type-2 SPS, retransmissions of a failed packet or TB may be triggered in sidelink with a dynamic grant for better transmission reliability.

Under various proposed schemes in accordance with the present disclosure, multiple resource allocation techniques based on available techniques in NR framework for eMBB uplink (UL) transmission may be utilized by first UE 110, second UE 120 and base station 135 for NR sidelink resource allocation. Under the proposed schemes, when first UE 110 operates in a network-controlled mode (Mode-1) or in an autonomous mode (Mode-2), a dynamic grant-like technique, a Type-1 GF-like technique and/or a Type-2 SPS-like technique may be utilized for resource allocation for the sidelink between first UE 110 and second UE 120.

Under the dynamic grant-like technique in accordance with the present disclosure, in terms of configuration, two options may be available, namely: (1) DCI from base station 135 or (2) SCI from another UE. In terms of use case, the dynamic grant-like technique may be utilized either for retransmissions or for both initial transmissions and retransmissions. SCI-based configuration may be more suitable for the case in which only retransmissions are allowed under the dynamic grant-like technique.

When first UE 110 operates in Mode-1, DCI from base station 135 may configure transmission resources, resource pool selection, and link adaptation parameters regarding the NR sidelink between first UE 110 and second UE 120, and retransmissions may be configured in the same manner. When first UE 110 operates in Mode-2, SCI from another UE (e.g., second UE 120 or a different UE (not shown)) may configure transmission resources, resource pool selection, and link adaptation parameters regarding the NR sidelink between first UE 110 and second UE 120, and retransmissions may be configured in the same manner.

Under a proposed scheme, in an event that first UE 110 switches between Mode-1 and Mode-2 (from Mode-1 to Mode-2 or from Mode-2 to Mode-1) after an initial transmission but before a retransmission, one or more of the following approaches may be adopted by first UE 110. In a first approach, first UE 110 may continue using the procedure described herein for the dynamic grant configuration for retransmission (as long as link is still alive). For instance, after first UE 110 switches from Mode-2 to Mode-1, first UE 110 may continue to monitor SCI for retransmission configuration. In a second approach, first UE 110 may switch to a different procedure for the dynamic grant configuration for retransmissions (as long as the link is still alive). For instance, after first UE 110 switches from Mode-2 to Mode-1, first UE 110 may stop monitoring SCI and, instead, may monitor DCI for retransmission configuration (for the packet/TB for which an initial transmission was configured via SCI). In a third approach, first UE 110 may monitor both DCI and SCI as a combination of the two approaches described above.

Under the Type-1 GF-like technique in accordance with the present disclosure, in terms of configuration, one option may be available ant that involves RRC signaling from base station 135. In terms of activation, deactivation and reconfiguration, two options may be available, namely: (1) DCI from base station 135 and (2) SCI from another UE.

When first UE 110 operates in Mode-1, RRC from base station 135 may configure transmission resources, resource pool selection, and link adaptation parameters regarding the NR sidelink between first UE 110 and second UE 120. Activation and deactivation of the Type-1 GF configuration may be provided by RRC from base station 135. Reconfiguration of some link parameters (e.g., modulation coding scheme (MCS), power control, a precoding matrix indicator (PMI), a rank indicator (RI), or a combination thereof) may be provided by RRC from base station 135 or by SCI from another UE (if explicitly configured by wireless network 130). Retransmission of a failed packet/TB may be configured by another dynamic grant-like signaling from wireless network 130.

When first UE 110 operates in Mode-2, RRC from base station 135 may preconfigure transmission resources, resource pool selection, and link adaptation parameters regarding the NR sidelink between first UE 110 and second UE 120. Here, "preconfigure" (as well as "pre-configuration") refers to a previous configuration when first UE 10 was in cellular coverage of base station 135. Activation and deactivation of the Type-1 GF configuration may be provided by either RRC from base station 135 (when first UE 110 is in coverage) or by SCI from another UE (e.g., second UE 120 or a different UE (not shown)). Reconfiguration of some link parameters (e.g., MCS, power control, a PMI, an RI, or a combination thereof) may be provided by RRC from base station 135 (when first UE 110 is in coverage) or by SCI from another UE. Retransmission of a failed packet/TB may be configured by another dynamic grant-like signaling from wireless network 130.

Under the Type-2 SPS-like technique in accordance with the present disclosure, in terms of configuration, one option may be available ant that involves RRC signaling from base station 135. In terms of activation, deactivation and reconfiguration, two options may be available, namely: (1) RRC from base station 135 and (2) SCI from another UE.

When first UE 110 operates in Mode-1, RRC from base station 135 may configure transmission resources, resource pool selection, and link adaptation parameters regarding the NR sidelink between first UE 110 and second UE 120. Activation and deactivation of the Type-2 SPS configuration may be provided by DCI from base station 135. Reconfiguration of some link parameters (e.g., MCS, power control, a PMI, an RI, or a combination thereof) may be provided by DCI from base station 135 or by SCI from another UE (if explicitly configured by wireless network 130). Retransmission of a failed packet/TB may be configured by another dynamic grant-like signaling from wireless network 130.

When first UE 110 operates in Mode-2, RRC from base station 135 may preconfigure transmission resources, resource pool selection, and link adaptation parameters regarding the NR sidelink between first UE 110 and second UE 120. Again, "preconfigure" (as well as "pre-configuration") refers to a previous configuration when first UE 10 was in cellular coverage of base station 135. Activation and deactivation of the Type-2 SPS configuration may be provided by either DCI from base station 135 (when first UE 110 is in coverage) or by SCI from another UE (e.g., second UE 120 or a different UE (not shown)). Reconfiguration of some link parameters (e.g., MCS, power control, a PMI, an RI, or a combination thereof) may be provided by DCI from base station 135 (when first UE 110 is in coverage) or by SCI from another UE. Retransmission of a failed packet/TB may be configured by another dynamic grant-like signaling from wireless network 130.

Under various proposed schemes in accordance with the present disclosure, SCI may convey or otherwise carry some sidelink parameters for the sidelink, including transmission resources, selection of a preconfigured resource pool, MCS, power control, a PMI, an RI, and so on. Under one proposed scheme, the list of configurable link parameters carried by SCI may depend on the resource allocation mode under which first UE 110 operates. For instance, first UE 110 may be expected to receive only link adaptation parameters from SCI in Mode-1 whereas first UE 110 may be expected to receive both link adaptation parameters and transmission resources from SCI in Mode-1.

Under another proposed scheme, the list of configurable link parameters carried by SCI may also depend on whether the transmission is an initial transmission or a retransmission. For instance, all configuration parameters may be received via DCI from base station 135 when first UE 110 is in Mode-1. However, first UE 110 may be expected to receive retransmission configurations for the same packet/TB via SCI from a source UE even if second UE 120, as the destination UE, still operates in Mode-1.

Under yet another proposed scheme, the list of configurable link parameters carried by SCI may be fixed in the 3GPP specifications (e.g., Rel-16) or the list may be signaled by wireless network 130. For instance, such information may be provided in broadcast signaling (e.g., system information block (SIB)). Moreover, this information may be RRC-configured for first UE 110.

Illustrative Implementations

Figure 3:
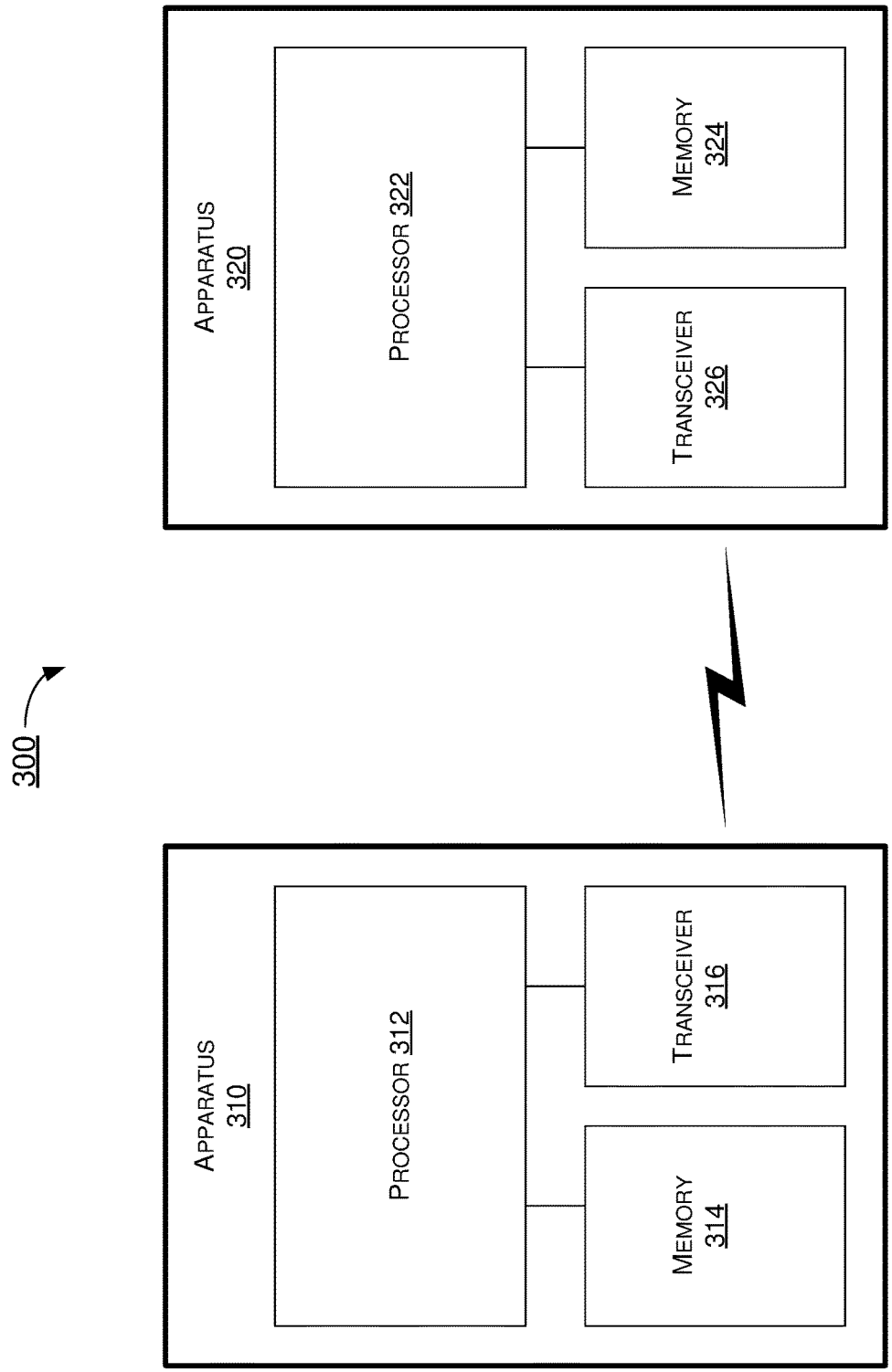
FIG. 3 is a block diagram of an example communication system in accordance with an implementation of the present disclosure.

FIG. 3 illustrates an example communication system 300 having an example apparatus 310 and an example apparatus 320 in accordance with an implementation of the present disclosure. Each of apparatus 310 and apparatus 320 may perform various functions to implement schemes, techniques, processes and methods described herein pertaining to sidelink resource allocation for V2X in NR mobile communications, including various schemes described above as well as processes described below.

Each of apparatus 310 and apparatus 320 may be a part of an electronic apparatus, which may be a UE such as a vehicle, a portable or mobile apparatus, a wearable apparatus, a wireless communication apparatus or a computing apparatus. For instance, each of apparatus 310 and apparatus 320 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 310 and apparatus 320 may also be a part of a machine type apparatus, which may be an IoT or NB-IoT apparatus such as an immobile or a stationary apparatus, a home apparatus, a wire communication apparatus or a computing apparatus. For instance, each of apparatus 310 and apparatus 320 may be implemented in a smart thermostat, a smart fridge, a smart door lock, a wireless speaker or a home control center. Alternatively, each of apparatus 310 and apparatus 320 may be implemented in the form of one or more integrated-circuit (IC) chips such as, for example and without limitation, one or more single-core processors, one or more multi-core processors, or one or more complex-instruction-set-computing (CISC) processors. Each of apparatus 310 and apparatus 320 may include at least some of those components shown in FIG. 3 such as a processor 312 and a processor 322, respectively. Each of apparatus 310 and apparatus 320 may further include one or more other components not pertinent to the proposed scheme of the present disclosure (e.g., internal power supply, display device and/or user interface device), and, thus, such component(s) of each of apparatus 310 and apparatus 320 are neither shown in FIG. 3 nor described below in the interest of simplicity and brevity.

In some implementations, at least one of apparatus 310 and apparatus 320 may be a part of an electronic apparatus, which may be a vehicle, a roadside unit (RSU), network node or base station (e.g., eNB, gNB or TRP), a small cell, a router or a gateway. For instance, at least one of apparatus 310 and apparatus 320 may be implemented in a vehicle in a V2V or V2X network, an eNodeB in an LTE, LTE-Advanced or LTE-Advanced Pro network or in a gNB in a 5G, NR, IoT or NB-IoT network. Alternatively, at least one of apparatus 310 and apparatus 320 may be implemented in the form of one or more IC chips such as, for example and without limitation, one or more single-core processors, one or more multi-core processors, or one or more CISC processors.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including sidelink resource allocation for V2X in NR mobile communications in accordance with various implementations of the present disclosure.

In some implementations, apparatus 310 may also include a transceiver 316, as a communication device, coupled to processor 312 and capable of wirelessly transmitting and receiving data. In some implementations, apparatus 310 may further include a memory 314 coupled to processor 312 and capable of being accessed by processor 312 and storing data therein. In some implementations, apparatus 320 may also include a transceiver 326, as a communication device, coupled to processor 322 and capable of wirelessly transmitting and receiving data. In some implementations, apparatus 320 may further include a memory 324 coupled to processor 322 and capable of being accessed by processor 322 and storing data therein. Accordingly, apparatus 310 and apparatus 320 may wirelessly communicate with each other via transceiver 316 and transceiver 326, respectively.

To aid better understanding, the following description of the operations, functionalities and capabilities of each of apparatus 310 and apparatus 320 is provided in the context of an NR V2X communication environment in which apparatus 310 is implemented in or as a wireless communication device, a communication apparatus or a UE (e.g., first UE 110) and apparatus 320 is implemented in or as a network node (e.g., base station 135 of wireless network 130).

In one aspect of sidelink resource allocation for V2X in NR mobile communications in accordance with the present disclosure, processor 312 of apparatus 310, implemented in a first UE (e.g., first UE 110), may receive, via transceiver 316, a first signaling from apparatus 320 as a network node of a wireless network, with the first signaling configuring a first sidelink resource for a sidelink between the first UE and a second UE. Additionally, processor 312 may transmit, via transceiver 316, a packet or TB to the second UE on the sidelink using the configured first sidelink resource. Moreover, processor 312 may receive, via transceiver 316, a second signaling from apparatus 320 in response to the second UE failing to decode the packet or TB, with the second signaling dynamically configuring a second sidelink resource for the sidelink. Furthermore, processor 312 may retransmit, via transceiver 316, the packet or TB to the second UE on the sidelink using the dynamically configured second sidelink resource.

In some implementations, the first signaling may include an RRC signaling, and the second signaling may include a DCI signaling. In such cases, the RRC signaling may include a semi-persistent grant that configures sidelink resource allocation for the sidelink. Additionally, the DCI signaling may dynamically configure the second sidelink resource.

In some implementations, the first signaling may include a first DCI signaling, and the second signaling may include a second DCI signaling. In some implementations, the first DCI signaling may include a semi-persistent grant that configures sidelink resource allocation for the sidelink. Moreover, the second DCI signaling may dynamically configure the second sidelink resource. Alternatively, the first DCI signaling may include a dynamic grant that configures sidelink resource allocation for the sidelink to dynamically configure the first sidelink resource. Furthermore, the second DCI signaling may dynamically configure the second sidelink resource.

In some implementations, in receiving the second signaling from apparatus 320, processor 312 may receive the second signaling from apparatus 320 in response to some previous operations. For instance, processor 312 may receive, via transceiver 316, a HARQ-NACK from the second UE in response to the second UE failing to decode the packet or TB. Additionally, processor 312 may transmit, via transceiver 316, the HARQ-NACK to apparatus 320.

In some implementations, processor 312 may receive, via transceiver 316, scheduling-related information from the second UE via an SCI signaling. In some implementations, the scheduling-related information may include a resource allocation grant, one or more link adaptation parameters for the sidelink, or a combination thereof.

In another aspect of sidelink resource allocation for V2X in NR mobile communications in accordance with the present disclosure, processor 312 of apparatus 310, implemented in a first UE (e.g., first UE 110), may receive, via transceiver 316, a signaling from apparatus 320 as a network node of a wireless network, with the signaling configuring a first sidelink resource for a sidelink between the first UE and a second UE. Additionally, processor 312 may transmit, via transceiver 316, a packet or TB to the second UE on the sidelink using the configured first sidelink resource. Moreover, processor 312 may receive, via transceiver 316, a HARQ-NACK from the second UE in response to the second UE failing to decode the packet or TB. Furthermore, processor 312 may switch between a first mode of operation and a second mode of operation before a retransmission of the packet of TB to the second UE due to the NACK-ACK. In the first mode of operation, resource allocation for the sidelink may be controlled by apparatus 320, and, in the second mode of operation, the resource allocation for the sidelink may be preconfigured by apparatus 320 and autonomously controlled by processor 312.

In some implementations, with the switching between the first mode of operation and the second mode of operation being a switch from the first mode to the second mode, processor 312 may perform additional operations. For instance, processor 312 may apply a configuration from the first mode of operation for the retransmission of the packet or TB when in the second mode of operation. Moreover, processor 312 may perform, via transceiver 316, the retransmission of the packet of TB to the second UE using a second sidelink resource configured by the configuration. In some implementations, the configuration may include a configuration for a plurality of parameters of the sidelink comprising a MCS, power control, a PMI, an RI, or a combination thereof.

In some implementations, with the switching between the first mode of operation and the second mode of operation being a switch from the second mode to the first mode, processor 312 may perform additional operations. For instance, processor 312 may apply a configuration from the second mode of operation for the retransmission of the packet or TB when in the first mode of operation. Moreover, processor 312 may perform, via transceiver 316, the retransmission of the packet of TB to the second UE using a second sidelink resource configured by the configuration. In some implementations, the configuration may include a configuration for a plurality of parameters of the sidelink comprising a MCS, power control, a PMI, an RI, or a combination thereof.

Illustrative Processes

Figure 4:
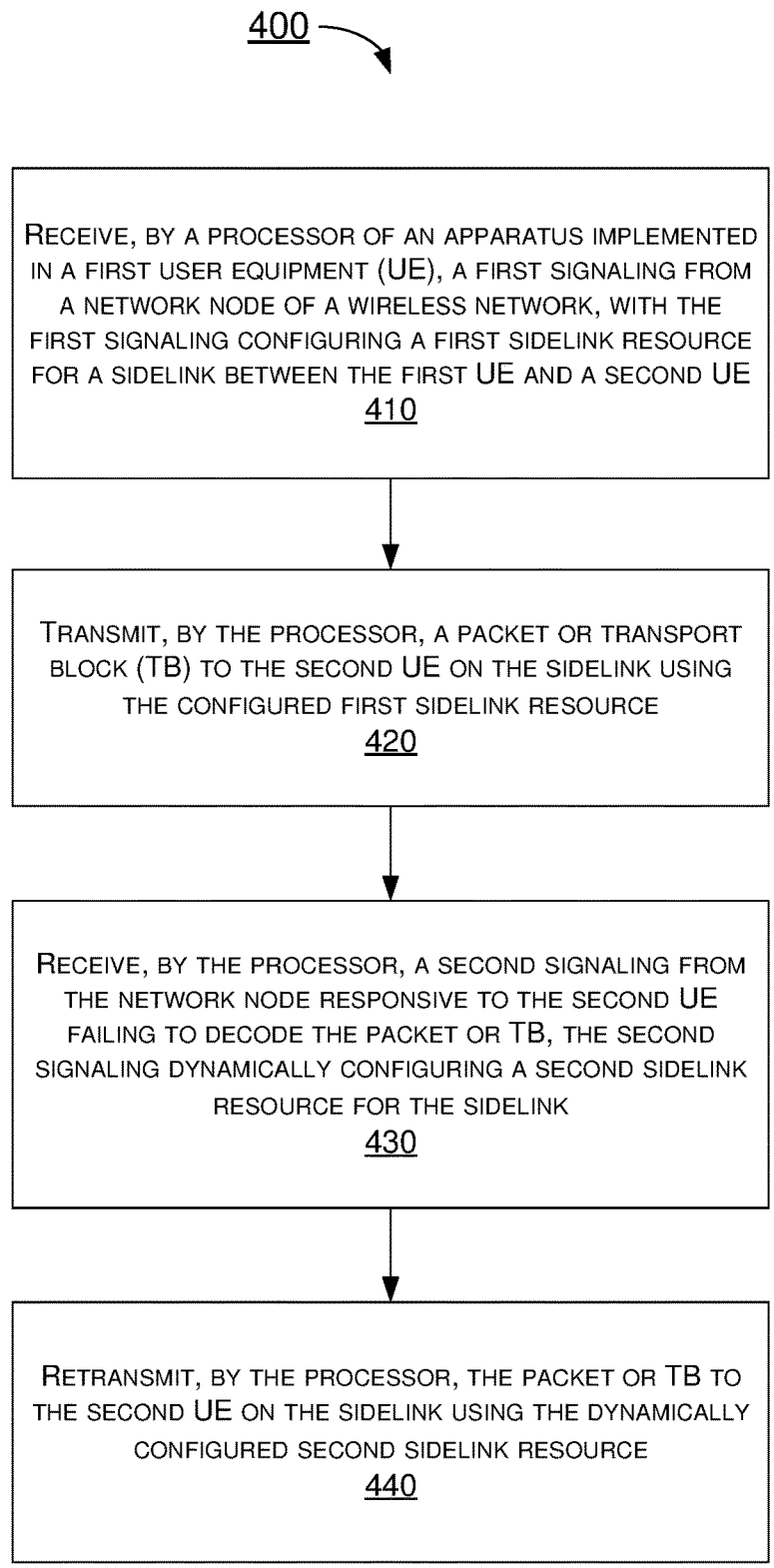
FIG. 4 is a flowchart of an example process in accordance with an implementation of the present disclosure.

FIG. 4 illustrates an example process 400 in accordance with an implementation of the present disclosure. Process 400 may be an example implementation of the proposed schemes described above with respect to sidelink resource allocation for V2X in NR mobile communications in accordance with the present disclosure. Process 400 may represent an aspect of implementation of features of apparatus 310 and apparatus 320. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may also be repeated partially or entirely. Process 400 may be implemented by apparatus 310, apparatus 320 and/or any suitable wireless communication device, UE, RSU, base station or machine type devices. Solely for illustrative purposes and without limitation, process 400 is described below in the context of apparatus 310 as a UE (e.g., first UE 110) and apparatus 320 as a network node (e.g., base station 135 of wireless network 130). Process 400 may begin at block 410.

At 410, process 400 may involve processor 312 of apparatus 310, implemented in a first UE (e.g., first UE 110), receiving, via transceiver 316, a first signaling from apparatus 320 as a network node of a wireless network, with the first signaling configuring a first sidelink resource for a sidelink between the first UE and a second UE. Process 400 may proceed from 410 to 420.

At 420, process 400 may involve processor 312 transmitting, via transceiver 316, a packet or TB to the second UE on the sidelink using the configured first sidelink resource. Process 400 may proceed from 420 to 430.

At 430, process 400 may involve processor 312 receiving, via transceiver 316, a second signaling from apparatus 320 in response to the second UE failing to decode the packet or TB, with the second signaling dynamically configuring a second sidelink resource for the sidelink. Process 400 may proceed from 430 to 440.

At 440, process 400 may involve processor 312 retransmitting, via transceiver 316, the packet or TB to the second UE on the sidelink using the dynamically configured second sidelink resource.

In some implementations, the first signaling may include an RRC signaling, and the second signaling may include a DCI signaling. In such cases, the RRC signaling may include a semi-persistent grant that configures sidelink resource allocation for the sidelink. Additionally, the DCI signaling may dynamically configure the second sidelink resource.

In some implementations, the first signaling may include a first DCI signaling, and the second signaling may include a second DCI signaling. In some implementations, the first DCI signaling may include a semi-persistent grant that configures sidelink resource allocation for the sidelink. Moreover, the second DCI signaling may dynamically configure the second sidelink resource. Alternatively, the first DCI signaling may include a dynamic grant that configures sidelink resource allocation for the sidelink to dynamically configure the first sidelink resource. Furthermore, the second DCI signaling may dynamically configure the second sidelink resource.

In some implementations, in receiving the second signaling from apparatus 320, process 400 may involve processor 312 receiving the second signaling from apparatus 320 in response to some previous operations. For instance, process 400 may involve processor 312 receiving, via transceiver 316, a HARQ-NACK from the second UE in response to the second UE failing to decode the packet or TB. Additionally, process 400 may involve processor 312 transmitting, via transceiver 316, the HARQ-NACK to apparatus 320.

In some implementations, process 400 may also involve processor 312 receiving, via transceiver 316, scheduling-related information from the second UE via an SCI signaling. In some implementations, the scheduling-related information may include a resource allocation grant, one or more link adaptation parameters for the sidelink, or a combination thereof.

Figure 5:
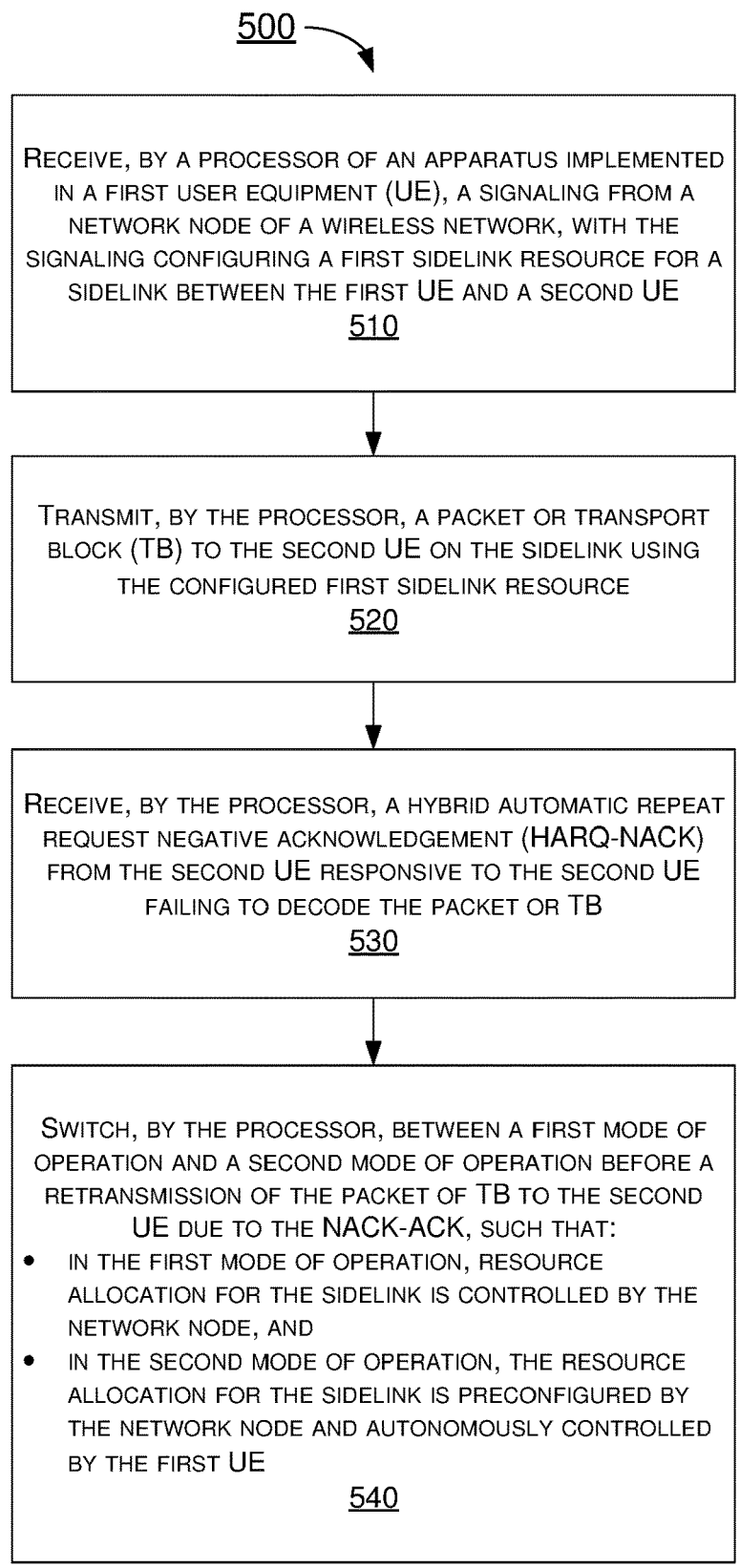
FIG. 5 is a flowchart of an example process in accordance with an implementation of the present disclosure.

FIG. 5 illustrates an example process 500 in accordance with an implementation of the present disclosure. Process 500 may be an example implementation of the proposed schemes described above with respect to sidelink resource allocation for V2X in NR mobile communications in accordance with the present disclosure. Process 500 may represent an aspect of implementation of features of apparatus 310 and apparatus 320. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 310, apparatus 320 and/or any suitable wireless communication device, UE, RSU, base station or machine type devices. Solely for illustrative purposes and without limitation, process 500 is described below in the context of apparatus 310 as a UE (e.g., first UE 110) and apparatus 320 as a network node (e.g., base station 135 of wireless network 130). Process 500 may begin at block 510.

At 510, process 500 may involve processor 312 of apparatus 310, implemented in a first UE (e.g., first UE 110), receiving, via transceiver 316, a signaling from apparatus 320 as a network node of a wireless network, with the signaling configuring a first sidelink resource for a sidelink between the first UE and a second UE. Process 500 may proceed from 510 to 520.

At 520, process 500 may involve processor 312 transmitting, via transceiver 316, a packet or TB to the second UE on the sidelink using the configured first sidelink resource. Process 500 may proceed from 520 to 530.

At 530, process 500 may involve processor 312 receiving, via transceiver 316, a HARQ-NACK from the second UE in response to the second UE failing to decode the packet or TB. Process 500 may proceed from 530 to 540.

At 540, process 500 may involve processor 312 switching between a first mode of operation and a second mode of operation before a retransmission of the packet of TB to the second UE due to the NACK-ACK. In the first mode of operation, resource allocation for the sidelink may be controlled by apparatus 320, and, in the second mode of operation, the resource allocation for the sidelink may be preconfigured by apparatus 320 and autonomously controlled by processor 312.

In some implementations, with the switching between the first mode of operation and the second mode of operation being a switch from the first mode to the second mode, process 500 may involve processor 312 performing additional operations. For instance, process 500 may involve processor 312 applying a configuration from the first mode of operation for the retransmission of the packet or TB when in the second mode of operation. Moreover, process 500 may involve processor 312 performing, via transceiver 316, the retransmission of the packet of TB to the second UE using a second sidelink resource configured by the configuration. In some implementations, the configuration may include a configuration for a plurality of parameters of the sidelink comprising a MCS, power control, a PMI, an RI, or a combination thereof.

In some implementations, with the switching between the first mode of operation and the second mode of operation being a switch from the second mode to the first mode, process 500 may involve processor 312 performing additional operations. For instance, process 500 may involve processor 312 applying a configuration from the second mode of operation for the retransmission of the packet or TB when in the first mode of operation. Moreover, process 500 may involve processor 312 performing, via transceiver 316, the retransmission of the packet of TB to the second UE using a second sidelink resource configured by the configuration. In some implementations, the configuration may include a configuration for a plurality of parameters of the sidelink comprising a MCS, power control, a PMI, an RI, or a combination thereof.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of vehicle-to-everything (V2X) communication in New Radio (NR), comprising:
receiving, by a processor of an apparatus implemented in a first user equipment (UE), a first signaling from a network node of a wireless network, the first signaling semi-statically pre-configuring a set of sidelink resources within a resource pool for a sidelink between the first UE and a second UE;

transmitting, by the processor, a packet or transport block (TB) to the second UE on the sidelink using a first sidelink resource selected by the first UE from the semi-statically pre-configured set of sidelink resources;

receiving, by the processor, a second signaling from the network node responsive to the second UE failing to decode the packet or TB, the second signaling dynamically configuring a second sidelink resource for the sidelink;

switching, by the processor, from a first mode of operation to a second mode of operation;

retransmitting, by the processor, the packet or TB to the second UE on the sidelink using the dynamically configured second sidelink resource;

receiving, by the processor, scheduling-related information from the second UE via a sidelink control information (SCI) signaling or a medium access control (MAC) control element (CE) signaling; and retransmitting, by the processor, the packet or TB to the second UE on the sidelink using the dynamically configured second sidelink resource, wherein the switching comprises:
switching from SCI monitoring to downlink control information (DCI) monitoring for a retransmission configuration; or
switching from the DCI monitoring to the SCI monitoring for the retransmission configuration.

2. The method of claim 1, wherein the first signaling comprises a radio resource control (RRC) signaling, and wherein the second signaling comprises a downlink control information (DCI) signaling.

3. The method of claim 2, wherein the RRC signaling comprises a semi-persistent grant that configures sidelink resource allocation for the sidelink, and wherein the DCI signaling dynamically configures the second sidelink resource.

4. The method of claim 1, wherein the first signaling comprises a first downlink control information (DCI) signaling, and wherein the second signaling comprises a second DCI signaling.

5. The method of claim 4, wherein the first DCI signaling comprises a semi-persistent grant that configures sidelink resource allocation for the sidelink, and wherein the second DCI signaling dynamically configures the second sidelink resource.

6. The method of claim 4, wherein the first DCI signaling comprises a dynamic grant that configures sidelink resource allocation for the sidelink to dynamically configure the first sidelink resource, and wherein the second DCI signaling dynamically configures the second sidelink resource.

7. The method of claim 1, wherein the receiving of the second signaling from the network node comprises receiving the second signaling from the network node responsive to:
receiving, by the processor, a hybrid automatic repeat request negative acknowledgement (HARQ-NACK) from the second UE responsive to the second UE failing to decode the packet or TB; and
transmitting, by the processor, the HARQ-NACK to the network node.

8. The method of claim 1, wherein the scheduling-related information comprises a resource allocation grant.

9. The method of claim 1, wherein the scheduling-related information comprises one or more link adaptation parameters for the sidelink.

10. A method of vehicle-to-everything (V2X) communication in New Radio (NR), comprising:
receiving, by a processor of an apparatus implemented in a first user equipment (UE), a signaling from a network node of a wireless network, the signaling semi-statically pre-configuring a set of sidelink resources within a resource pool for a sidelink between the first UE and a second UE;

transmitting, by the processor, a packet or transport block (TB) to the second UE on the sidelink using a first sidelink resource selected by the first UE from the semi-statically pre-configured set of sidelink resources;

receiving, by the processor, a hybrid automatic repeat request negative acknowledgement (HARQ-NACK) from the second UE responsive to the second UE failing to decode the packet or TB;

switching, by the processor, from a first mode of operation to a second mode of operation before a retransmission of the packet of TB to the second UE due to the NACK-ACK;

receiving, by the processor, scheduling-related information from the second UE via a sidelink control information (SCI) signaling or a medium access control (MAC) control element (CE) signaling; and retransmitting, by the processor, the packet or TB to the second UE on the sidelink using the second mode of operation, wherein, in the first mode of operation, resource allocation for the sidelink is controlled by the network node, wherein, in the second mode of operation, the resource allocation for the sidelink is preconfigured by the network node and autonomously controlled by the first UE, wherein the switching comprises:
switching from SCI monitoring to downlink control information (DCI) monitoring for a retransmission configuration; or
switching from the DCI monitoring to the SCI monitoring for the retransmission configuration.

11. The method of claim 10, with the switching between the first mode of operation and the second mode of operation being a switch from the first mode to the second mode, further comprising:
applying, by the processor, a configuration from the first mode of operation for the retransmission of the packet or TB when in the second mode of operation; and
performing, by the processor, the retransmission of the packet of TB to the second UE using a second sidelink resource configured by the configuration.

12. The method of claim 11, with the configuration comprises a configuration for a plurality of parameters of the sidelink comprising a modulation coding scheme (MCS), power control, a precoding matrix indicator (PMI), a rank indicator (RI), or a combination thereof.

13. The method of claim 10, with the switching between the first mode of operation and the second mode of operation being a switch from the second mode to the first mode, further comprising:
applying, by the processor, a configuration from the second mode of operation for the retransmission of the packet or TB when in the first mode of operation; and
performing, by the processor, the retransmission of the packet of TB to the second UE using a second sidelink resource configured by the configuration.

14. The method of claim 13, with the configuration comprises a configuration for a plurality of parameters of the sidelink comprising a modulation coding scheme (MCS), power control, a precoding matrix indicator (PMI), a rank indicator (RI), or a combination thereof.

15. An apparatus implemented as a first user equipment (UE), comprising:
a transceiver configured to wirelessly communicate with a second UE and a network node of a wireless network; and
a processor coupled to the communication device and configured to perform operations comprising:
receiving, via the transceiver, a first signaling from a network node of a wireless network, the first signaling semi-statically pre-configuring a set of sidelink resources within a resource pool for a sidelink between the first UE and a second UE;
transmitting, via the transceiver, a packet or transport block (TB) to the second UE on the sidelink using a first sidelink resource selected by the first UE from the semi-statically pre-configured set of sidelink resources;
receiving, via the transceiver, a second signaling from the network node responsive to the second UE failing to decode the packet or TB, the second signaling dynamically configuring a second sidelink resource for the sidelink;
switching from a first mode of operation to a second mode of operation;
retransmitting, via the transceiver, the packet or TB to the second UE on the sidelink using the dynamically configured second sidelink resource;
receiving, via the transceiver, scheduling-related information from the second UE via a sidelink control information (SCI) signaling or a medium access control (MAC) control element (CE) signaling; and
retransmitting, via the transceiver, the packet or TB to the second UE on the sidelink using the dynamically configured second sidelink resource,
wherein the switching comprises:
switching from SCI monitoring to downlink control information (DCI) monitoring for a retransmission configuration; or
switching from the DCI monitoring to the SCI monitoring for the retransmission configuration.

16. The apparatus of claim 15, wherein the first signaling comprises a radio resource control (RRC) signaling, wherein the second signaling comprises a downlink control information (DCI) signaling, wherein the RRC signaling comprises a semi-persistent grant that configures sidelink resource allocation for the sidelink, and wherein the DCI signaling dynamically configures the second sidelink resource.

17. The apparatus of claim 15, wherein the first signaling comprises a first downlink control information (DCI) signaling, wherein the second signaling comprises a second DCI signaling, wherein the first DCI signaling comprises a semi-persistent grant that configures sidelink resource allocation for the sidelink, and wherein the second DCI signaling dynamically configures the second sidelink resource.

18. The apparatus of claim 15, wherein the first signaling comprises a first downlink control information (DCI) signaling, wherein the second signaling comprises a second DCI signaling, wherein the first DCI signaling comprises a dynamic grant that configures sidelink resource allocation for the sidelink to dynamically configure the first sidelink resource, and wherein the second DCI signaling dynamically configures the second sidelink resource.

19. The apparatus of claim 15,
wherein the scheduling-related information comprises a resource allocation grant, one or more link adaptation parameters for the sidelink, or a combination thereof.

* * * * *